Jan. 12, 1937.  W. FERRIS  2,067,483
CENTER BEARING FOR HYDRAULIC LOCOMOTIVES
Original Filed Jan. 30, 1933  5 Sheets-Sheet 1
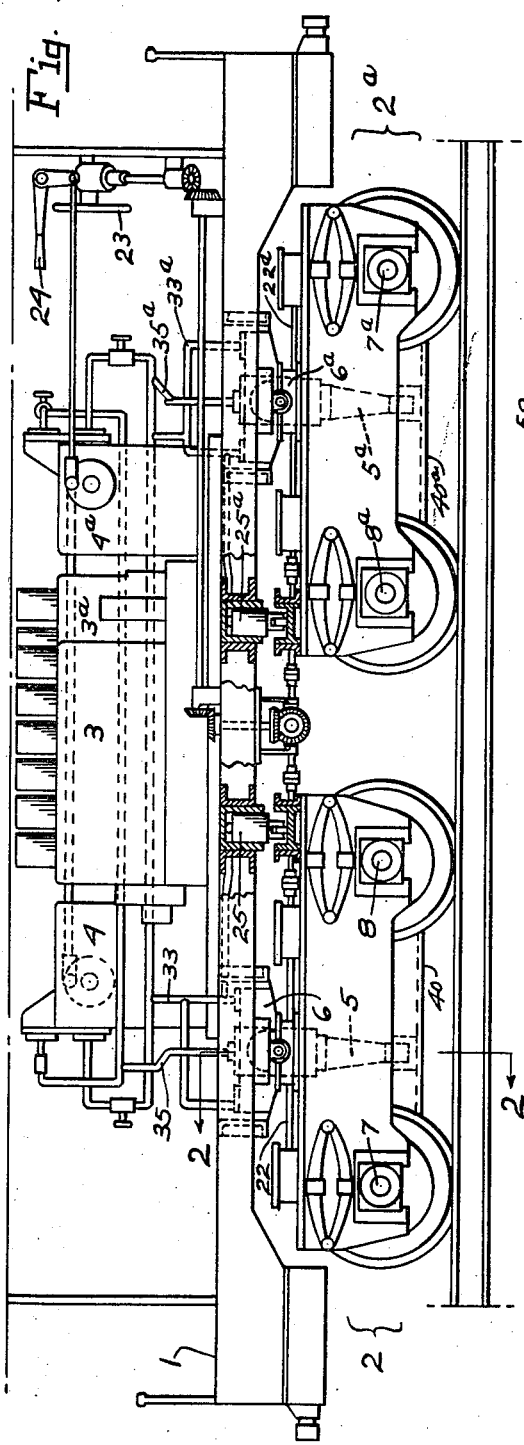
INVENTOR
WALTER FERRIS
BY
ATTORNEY.

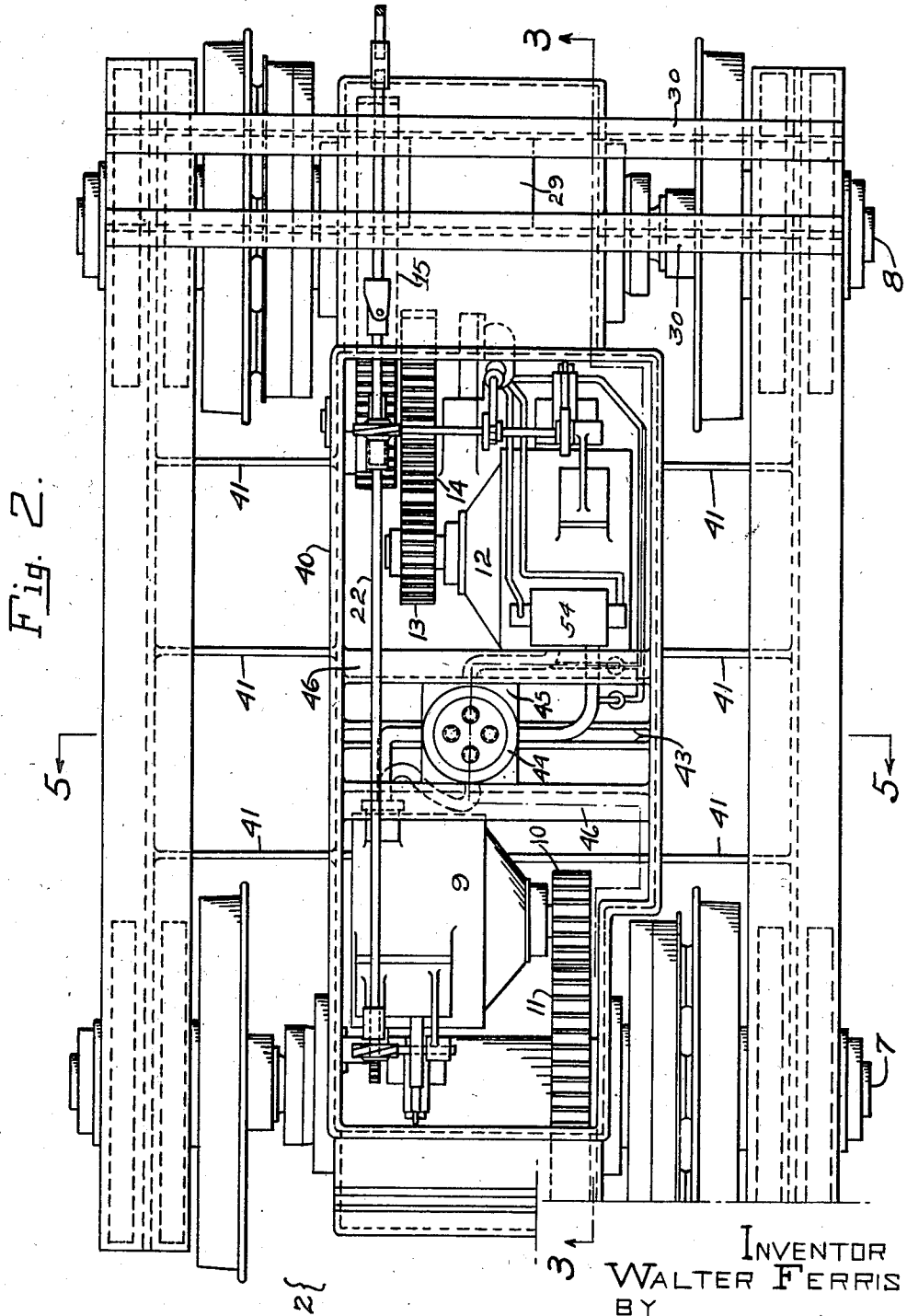

Jan. 12, 1937.　　　W. FERRIS　　　2,067,483
CENTER BEARING FOR HYDRAULIC LOCOMOTIVES
Original Filed Jan. 30, 1933　　5 Sheets-Sheet 3
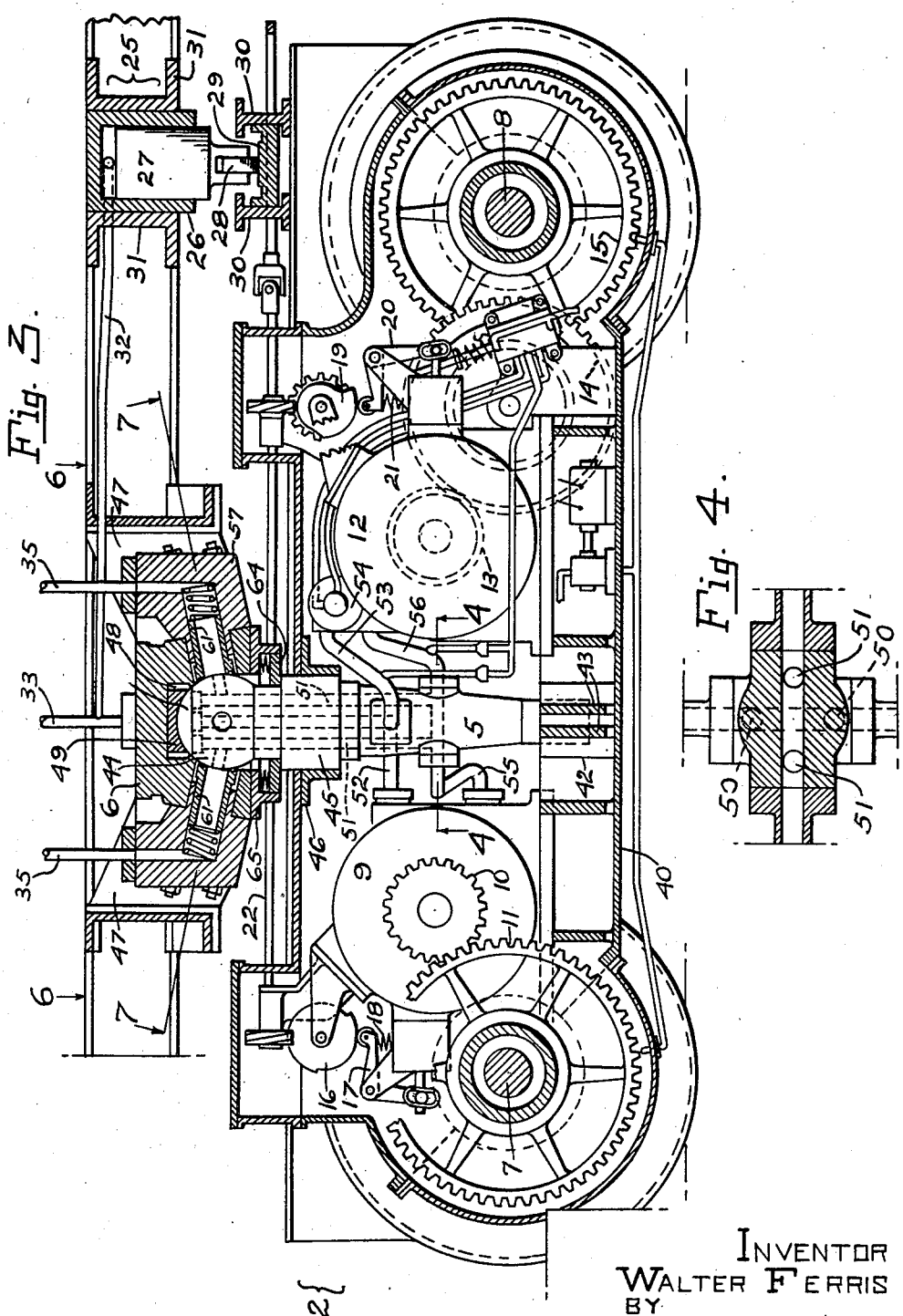
INVENTOR
WALTER FERRIS
BY
ATTORNEY.

Jan. 12, 1937.　　　W. FERRIS　　　2,067,483
CENTER BEARING FOR HYDRAULIC LOCOMOTIVES
Original Filed Jan. 30, 1933　　5 Sheets-Sheet 4

INVENTOR
WALTER FERRIS
BY
Wesley Merrill
ATTORNEY.

Patented Jan. 12, 1937

2,067,483

UNITED STATES PATENT OFFICE 2,067,483

CENTER BEARING FOR HYDRAULIC LOCOMOTIVES

Walter Ferris, Milwaukee, Wis., assignor to The Oilgear Company, Milwaukee, Wis., a corporation of Wisconsin Original application January 30, 1933, Serial No. 654,157, now Patent No. 2,037,373, dated April 14, 1936. Divided and this application December 31, 1934, Serial No. 759,886

15 Claims. (Cl. 105—175)

This invention relates to self-propelled vehicles of the type having a body or frame supported upon a plurality of trucks, one or more fluid motors arranged upon one or more of the trucks to drive the vehicle, and a power plant arranged upon the body or frame and connected to each motor to supply fluid thereto, such as the power vehicle described and claimed in Patent No. 2,037,373, issued April 14, 1936 on application Serial No. 654,157 filed January 30, 1933 of which this application is a division.

In order that the vehicle may travel around curves, it is essential that each truck be permitted to turn relative to the body or frame and that each motor be connected to the power plant through a flexible joint.

This invention has as an object to provide a vehicle of the above character with a center bearing which supports the body or frame upon a truck, permits the truck to turn relative to the body or frame, transmits propelling force from the truck to the body or frame, and provides means for transmitting motive fluid from the power plant to the motor or motors.

The invention is exemplified by the hydraulic locomotive shown somewhat schematically in the accompanying drawings in which the views are as follows:

Fig. 1 is a side elevation of the locomotive.

Fig. 2 is a top plan view of one of the trucks.

Fig. 3 is a vertical section taken on the irregular line 3—3 of Fig. 2.

Fig. 4 is a horizontal section taken on the line 4—4 of Fig. 3.

Fig. 5 is a transverse section taken in the plane of the line 5—5 of Fig. 2.

Fig. 6 is a top plan view of the center bearing as indicated in Fig. 3 by the arrows 6—6.

Fig. 7 is a sectional plan view taken along the irregular line 7—7 of Fig. 3.

Fig. 8 is a detailed sectional view of a flexible joint through which liquid is transmitted from the power plant to the motors.

Figure 9:
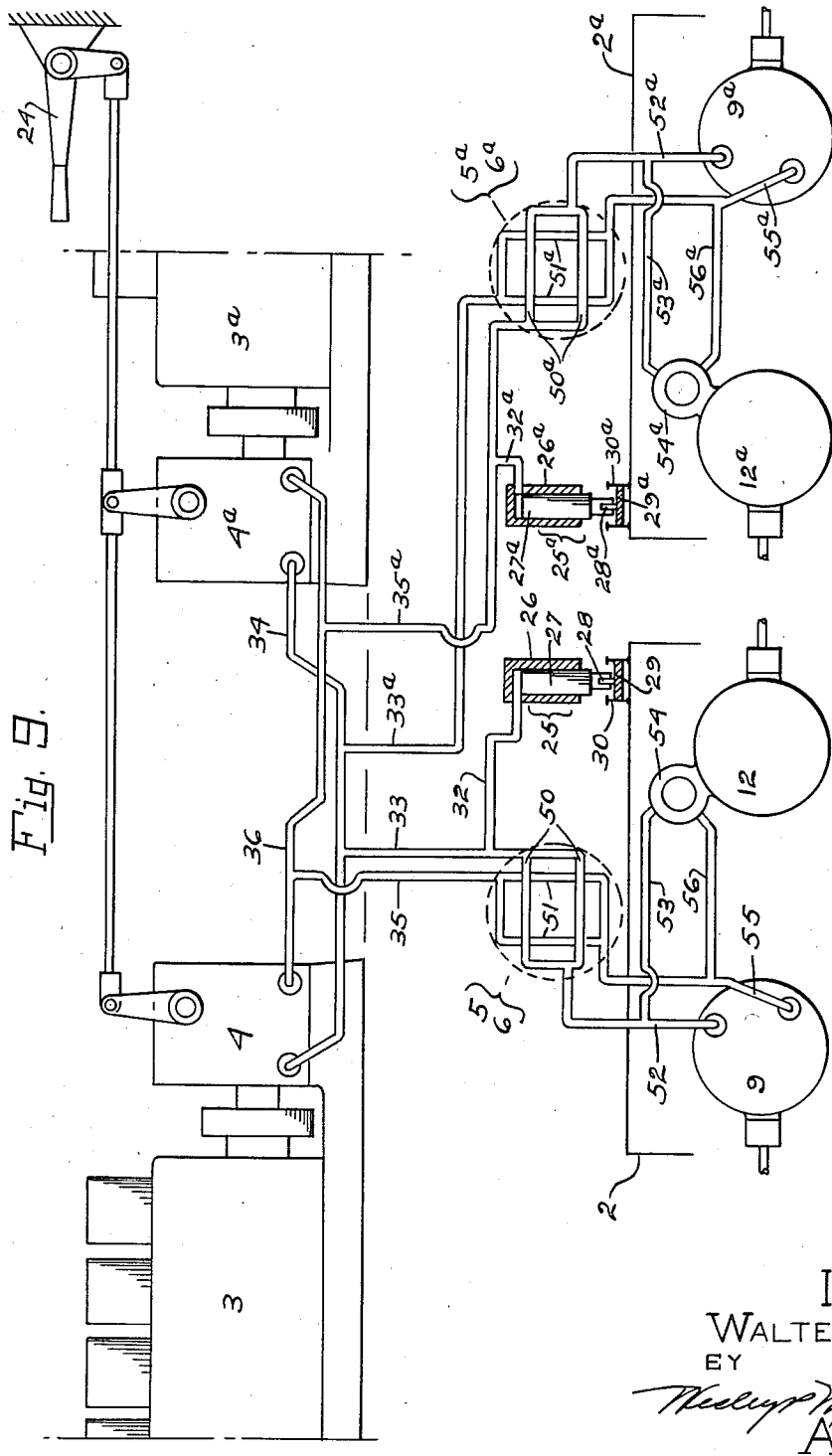
Fig. 9 is a diagram of the hydraulic circuit.

The locomotive has not been fully illustrated nor will it be described in detail for the reason that it is illustrated and described in the application referred to above.

Briefly, it is provided with a body 1 which is supported upon two trucks 2 and 2ª and carries two internal combustion engines 3 and 3ª and two reversible pumps 4 and 4ª which are driven, respectively, by the engines 3 and 3ª.

The trucks 2 and 2ª are identical but are arranged in the reverse position in the body 1.

That is, one truck is turned end for end in respect to the other truck.

The locomotive is symmetrical about its transverse centerline and, in order that corresponding parts may be readily distinguished, the parts on one side of the centerline have been designated by certain reference numerals and the corresponding parts on the other side of the centerline have been designated by the same reference numerals with the exponent "a" added.

The body 1 is supported upon each of the trucks by a center bearing consisting of a post 5 and a socket 6 which will be described in detail hereinafter.

Each truck is supported at one end by two wheels fixed upon an axle 7 and at the other end by two wheels fixed upon an axle 8. As shown in Figs. 2 and 3, the axle 7 is driven by a variable displacement rotary hydraulic motor 9 through single reduction gearing 10—11, and the axle 8 is driven by a variable displacement rotary hydraulic motor 12 through double reduction gearing 13—14—15.

Under certain conditions of operation, the motors 9 and 12 are simultaneously supplied with liquid from the pumps 4 and 4ª so that the torque of the two motors is the same. Consequently, the motor 12 will operate at a higher speed than the motor 9 and will exert a greater rotative force upon the axle 8 than the motor 9 exerts upon the axle 7 due to the fact that the ratio of the gearing 13—14—15 is much greater than the ratio of the gearing 10—11.

The motors 9 and 12 are driven by liquid supplied thereto from the pumps 4 and 4ª. The direction in which the motors are driven depends upon the direction in which the liquid is delivered thereto, and the speed at which each motor is driven depends upon its displacement and upon the rate at which the liquid is delivered to the motor.

The displacement of the motor 9 is varied by a cam wheel 16 (Fig. 3) acting through a bell crank lever 17 which has one of its arms connected by a pin and slot connection to the stroke changing element of the motor and its other arm provided with a roller and urged by a spring 18 in a direction to decrease motor displacement, the spring 18 holding the roller against the periphery of the cam wheel 16.

Displacement of the motor 12 is varied by a cam wheel 19 acting through a bell crank lever 20 which has one of its arms connected by a pin and slot connection to the stroke changing element of the motor and its other arm provided with a roller and urged by a spring 21 in a direction to decrease motor displacement, the spring 21 holding the roller against the periphery of the cam wheel 19.

The cam wheels 16 and 19 may be rotated simultaneously by a control shaft 22 (Figs. 2 and 3) which is connected by suitable gearing to the shafts on which the cam wheels 16 and 19 are fixed. The shaft 22 is connected through suitable shafting and gearing to a handwheel 23 (Fig. 1) arranged at one end of the body 1, universal joints being arranged in the shafting to provide for the trucks pivoting beneath the body when the locomotive travels around a curve. The motors on the truck 2ª are similarly controlled from the same handwheel so that all motors may be adjusted simultaneously.

The contours of the cam wheels 16 and 19 are such that, during rotation of the handwheel 23, the displacement of the motor 12 is gradually reduced faster than the displacement of the motor 9 until the displacement of motor 12 is at a predetermined minimum at which time it is suddenly reduced to zero and the motor short-circuited, and the displacement of the motor 9 is simultaneously suddenly increased by a like amount as fully explained in the application referred to above. Thereafter, the displacement of the motor 9 may be gradually reduced until it is at a predetermined minimum.

The delivery of liquid to the motors is controlled by varying the rate and the direction of delivery from the pumps 4 and 4ª each of which has it displacement varying mechanism connected by suitable linkage to a lever 24 arranged at one end of the body 1.

When the lever 24 is in its central or neutral position, the pumps are at zero stroke and no liquid is being delivered thereby. When the lever 24 is moved in one direction or the other from neutral position, the pumps will deliver liquid in one direction or the other and at a rate depending upon the distance the lever 24 is moved from its neutral position.

In starting the locomotive from a stationary position, at which time the pumps 4 and 4ª are at zero stroke, the control wheel 23 is operated to adjust the motors to full stroke in order that they may have the highest torque and then the control lever 24 is operated to adjust the pumps and cause them to deliver liquid at a limited volumetric rate to the motors whereby the full power of the engines 3 and 3ª is available for operating the motors at slow speed and enabling them to exert high rotative forces upon the driving wheels and thereby start the locomotive and its load.

After the locomotive has been started, the control lever 24 may be operated to increase pump displacement and thereby increase the speed of the locomotive until the pumps are at full stroke and then the handwheel 23 may be operated to reduce motor displacement and thereby further increase the motor speed with the resultant increase in the speed of the locomotive.

When the handwheel 23 has been rotated until the displacement of the high speed motor 12 has been reduced to the predetermined minimum, the motor 12 is operating at approximately the highest speed for which it is designed to work with its pistons reciprocating and transmitting power. Further rotation of the handwheel 23 causes the high speed motor on each truck to be suddenly adjusted to zero displacement and short-circuited and the entire output of the pump to be directed to the two low speed motors the displacements of which were suddenly increased simultaneously with the sudden reduction in the displacement of the high speed motors. Still further rotation of the handwheel 23 reduces the displacement of the two low speed motors and further increases the speed of the locomotive.

The characteristics thus far described form no part of the present invention but are described and claimed in the application referred to above.

When the motors are energized to propel the locomotive, the inertia of the body 1 and the draw-bar force exerted by the locomotive tend to shift weight from the leading axle of each truck to the following axle of that truck in respect to the direction of movement for the reason that the draw-bar pull and the center of gravity of the accelerated masses are in much higher planes than the rails which exert tractive force upon the wheels. The amount of weight thus shifted is proportional to the tractive force exerted by the locomotive, and the tractive force is proportional to the working pressure existing in the liquid which drives the motors.

If no provision were made for counteracting this weight-shifting effect, the front wheels of each truck would slip long before the motors exerted a maximum rotative force upon the rear wheels, thereby materially limiting the tractive effort of the locomotive.

Slippage of the front wheels of a truck is prevented by exerting an independent loading force upon the front axle of the truck in response to a tractive effort of the locomotive or by so supporting the locomotive upon the truck that the front axle of the truck carries a greater weight than the rear axle when the locomotive is idle. In the latter case, when the locomotive is started or is exerting a tractive effort upon an independently supported load, the weight shifted from the front axle to the rear axle will approximately equalize the load upon the two axles at the maximum draw-bar pull and enable both the front and the rear wheels to have sufficient traction to start the locomotive or to move an independently supported load.

If unequal loading of the axles were solely depended upon to prevent wheel slippage, it is obvious that all of the wheels would have sufficient traction only when the locomotive was operated in but one direction, while if the application of an independent loading force to the front axles were solely depended upon to prevent wheel slippage, it would be necessary to provide mechanisms for selectively exerting independent loading forces upon all axles in order that the locomotive might operate in either direction and all of its wheels have sufficient traction in either direction of operation.

In order that the number of mechanisms for exerting independent loading forces upon the axles may be kept at a minimum in a locomotive which is operable in either direction, the locomotive body is supported upon each truck at a point nearer to one axle than to the other axle so that the nearer axle of each truck carries a greater load than the far axle when the locomotive is idle, a loading mechanism is provided for exerting an independent loading force upon the far axle of each truck, and only one of those loading mechanisms is energized at a time, the one energized depending upon the direction in which the locomotive moves or tends to move.

As shown, the center bearing 5—6 on the truck 2 is arranged nearer the axle 7 than to the axle 8, a hydraulic jack 25 is secured to the body 1 above the axle 8 to exert an independent loading force thereon whenever the locomotive tends to move in the direction which makes the axle 8 the leading axle. The truck 2ª is turned end for end so that the two axles 7 and 7ª carry greater loads than the center axles 8 and 8ª when the locomotive is idle, and a hydraulic jack 25ª is secured to the body 1 above the axle 8ª to exert an independent loading force thereon whenever the locomotive tends to move in the direction which makes the axle 8ª the leading axle of truck 2ª.

Of course, the arrangement could be reversed so that the center bearings would be arranged nearer the center axles 8 and 8ª and the jacks 25 and 25ª would be arranged above the axles 7 and 7ª.

The jack 25 consists primarily of a cylinder 26 and a piston 27 fitted therein and provided upon its lower end with a roller 28 to engage a bearing plate 29 fixed between two beams 30 which extend across the end of the truck 2 and are supported upon the side frames thereof.

The cylinder 26 is fastened to the body 1 upon the under side thereof as by being secured between two channel bars 31 which extend across the body 1 and are fastened to the side sills thereof. The jack 25ª is similarly constructed and arranged.

As shown in Fig. 9, the cylinder 26 of the jack 25 is connected at its upper end by a pipe 32 to a pipe 33 intermediate the ends thereof. The pipe 33 has one of its ends connected to the socket 6 of the center bearing on the truck 2 and its other end connected to a pipe 34 intermediate the ends thereof. The pipe 34 has its ends connected to corresponding ports of the pumps 4 and 4ª and is connected intermediate its ends by a pipe 33ª to the socket 6ª of the center bearing on the truck 2ª.

The cylinder 26ª of the jack 25ª is connected at its upper end by a pipe 32ª to a pipe 35ª intermediate the ends thereof. The pipe 35ª has one of its ends connected to the socket 6ª of the center bearing on the trucks 2ª and its other end connected to a pipe 36 intermediate the ends thereof. The pipe 36 has its ends connected to corresponding ports of the pumps 4 and 4ª and is connected intermediate its ends by a pipe 35 to the socket 6 of the center bearing on the truck 2.

The arrangement is such that, when the pumps 4 and 4ª deliver liquid into the pipe 34, the motors will move the locomotive toward the right in respect to Fig. 1 and the pressure in the cylinder 26 will be proportional to the tractive effort of the locomotive, thereby enabling the jack 25 to exert a loading force upon the axle 8 to overcome the weight shifting effect of the tractive force. When the pumps 4 and 4ª deliver liquid into the pipe 36, the motors will move the locomotive in the opposite direction and the jack 25ª will be energized to overcome the weight shifting effect of the tractive force.

The above described mechanism for exerting independent loading forces upon the axles 8 and 8ª forms no part of the present invention but is described and claimed in Patent No. 2,042,519.

As previously stated, the present invention relates more particularly to the center bearings which support the body 1 and transmit propelling forces thereto and through which liquid is delivered by the pump to the motors and returned from the motors to the pump.

The center bearing on the truck 2 has its male part or bearing post 5 rigidly secured in a casing 40 which encloses the driving mechanism and is fixed to the side frames of the truck by the plurality of webs 41 (Figs. 2 and 5). The post 5 has its lower end reduced in diameter and fitted in a socket 42 which is supported from the side walls of the casing 40 by webs 43. The socket 42 supports the post 5 and restrains the lower end thereof from movement in any direction.

The post 5 is provided upon its upper end with a spherical head 44 and has its upper end restrained from movement in any lateral direction by a thrust block 45 which is closely fitted upon the post 5 below the head 44 and rigidly fastened between two struts 46 extending across the top of the casing 40 and secured to the side walls thereof. The socket 42 and the thrust block 45 enable the post 5 to transmit propelling forces from the truck 2 to the body 1.

Weight is transferred from the body 1 to the post 5 through the socket 6 which is rigidly secured to the body 1 upon the underside thereof as by means of four arms 47 secured to or formed integral with the socket 6 and fastened to the under frame of the body.

The spherical head 44 on the post 5 extends upward into a bore which is formed in the socket 6 and is cylindrical from the bottom of the socket 6 to substantially the horizontal centerline of the head 44, then changes to spherical form and conforms to the surface of the head 44 for a short distance, and then opens into a recess 48 formed in the socket 6.

The recess 48 contains a bearing plate 49 which bears against the top of the recess but is free to shift laterally as the truck shifts slightly relatively to the socket 6. Bearing plate 49 has a concave underface complementary to the head 44 and bearing thereon to transfer weight from the body 1 to the head 44.

The bearing plate 49 has oil grooves formed in its underface and is provided with lubricant through a channel not shown.

The post 5 has two fluid channels 50 and two fluid channels 51 extending axially thereof and then radially outward and terminating upon the spherical surface of the head 44 which preferably has a segment of its upper part made as a separate piece which forms a bearing cap 44' and rests upon the flat horizontal top of the head proper.

The cap 44' provides a smooth and uniform bearing surface upon the top of the head 44 after the channels 50 and 51 have been drilled from the outside of the head and the upper ends of the axial parts of the channels plugged, as shown in Figs. 2 and 5.

The channels 50 are formed diametrically opposite each other in the post 5 and connected together at the lower ends thereof as shown in Fig. 5. The lower ends of both channels 50 are connected by a pipe 52 (Figs. 3 and 9) to the motor 9 and by a pipe 53 to a valve 54 which controls the motor 12 and is adapted to short-circuit it when motor displacement has been reduced to a predetermined minimum, as explained in U. S. Patent 2,037,373 referred to above.

The channels 51 are arranged diametrically opposite each other 90° from the channels 50 and have the lower ends thereof connected together. The lower ends of both channels 51 are connected to the motor 9 by a pipe 55 and to the valve 54 by a pipe 56 as shown in Figs. 3 and 9.

The channels 50 and 51 communicate, respectively, with the pipes 33 and 35 each of which is divided at its lower end (Fig. 1) into two branches and connected to the socket 6 by a fitting 57 (Figs. 5 and 7) one of which is arranged upon each of the four sides of the socket. The pipe 33 has its two branches connected to the fittings 57 upon opposite sides of the socket 6 and the pipe 35 has its two branches connected to the fittings 57 which are on the other two sides of the socket 6 and consequently opposite each other.

Each fitting 57 is rigidly secured to the socket 6 and forms an oil-tight joint therewith. As best shown in Figs. 5 and 7, each fitting 57 is fastened to the socket 6 by bolts 58 and has a cylindrical inner end tightly fitted in a bore 59 (Fig. 8) which is formed in the socket 6 and extends from the outside thereof to the bore in which the head 44 of the post 5 is arranged.

Each fitting 57 has a bore 60 formed in the lower part thereof and communicating at its outer end with a branch of the pipe 33 or the pipe 35. The bore 60 has a hollow plunger or thimble 61 closely fitted therein and urged against the head 44 by a spring 62 arranged in the outer end of the bore 60.

The inner end of the thimble 61 is closely fitted to the surface of the head 44 and has a drainage or pressure limit groove 63 formed therein between its inner and outer peripheries.

The liquid in the outer end of the bore 60 acts upon the outer end of the thimble 61 and urges the inner end thereof against the head 44 with a force proportional to the pressure of the liquid. The thimble 61 is thus urged against the head 44 by the constant force exerted by the spring and by a variable force exerted by the liquid. The wall of the thimble at the inner end thereof is preferably thickened in order that it may have an ample bearing surface in engagement with the head 44.

A film of liquid will be maintained between the head 44 and the inner end of the thimble 61, and pressure will extend from the bore 60 into this film. The pressure in this film urges the thimble outward and, if it were not for the limit groove 63, the pressure in the film might prevent the thimble from bearing upon the head 44 with sufficient force to prevent unnecessary leakage between the thimble and the head. The groove 63 is drained, as by means of one or more small grooves extending therefrom to the outer periphery of the thimble, so that the pressure therein and between the bearing surfaces outside of said groove is substantially zero.

The bore of the thimble 61 and the upper end of the channel 50 or 51 with which it registers are so proportioned that they will remain in registry when the truck pivots beneath the body 1 as the locomotive travels around the sharpest curve which may be encountered.

Due to the fact that the pipes 33 and 35 are connected to the socket 6 at points diametrically opposite each other, the socket 6 is hydrostatically balanced upon the head 44, thereby permitting the head 44 to turn easily in the socket 6 and permitting substantially fluid-tight joints between the head 44 and the socket 6 to be easily provided.

The head 44 and the socket 6 provide a universal joint for supporting the body 1 and, together with the thimbles 61, provide flexible fluid connections between the pumps on the body and the motors on the trucks. Further, the arrangement is such that the trucks may be removed by simply elevating the body 1 without disconnecting any pipe or mechanical connection.

Liquid employed for lubricating the head 44 and any liquid escaping past the thimble 61 is collected upon an annular collector plate 64 which is closely fitted upon the post 5 below the head 44 and has its outer periphery fitted within an annular flange 65 depending from and carried by the socket 6.

Suitable packing is employed to prevent leakage from the chamber which is formed by the plate 64 and the flange 65 from which liquid is drained into the casing 40 through a channel not shown. The plate 64 is urged downward against the thrust block 45 by a plurality of springs 66 which may also be employed to retain the packing in position.

The center bearing on the truck $2^a$ corresponds exactly to the center bearing on the truck 2. Consequently, such parts as are shown have been indicated by corresponding reference numerals with the exponent "$a$" added. However, since the truck $2^a$ is reversed in respect to the truck 2, the fluid connections between the trucks and the body are also reversed in order that the motors on both trucks may operate in the same direction. That is, the channels $50^a$ in the post $5^a$ are connected through the pipe $35^a$ to the pipe 36 and the channels $51^a$ are connected through the pipe $33^a$ to the pipe 34.

The invention herein set forth is susceptible of various modifications without departing from the scope thereof as hereafter claimed.

The invention is hereby claimed as follows:

1. In a power vehicle having a body, a truck arranged beneath said body, a hydraulic motor carried by said truck to propel said vehicle and a pump carried by said body for supplying motive liquid to said motor, the combination of an upper bearing member fixed to said body and having fluid channels connected to said pump, and a lower bearing member fixed to said truck and fitted to said upper bearing member to support said body and having fluid channels connected to said motor and in registry with the fluid channels in said upper bearing member, said bearing members forming a universal joint between said body and said truck and forming flexible fluid connections between said motor and said pump.

2. In a power vehicle having a body, a truck arranged beneath said body, a hydraulic motor carried by said truck to propel said vehicle and a pump carried by said body for supplying motive liquid to said motor, the combination of an upper bearing member fixed to said body and having fluid channels connected to said pump, and a lower bearing member fixed to said truck and fitted to said upper bearing member to support said body and having fluid channels connected to said motor and in registry with the fluid channels in said upper bearing member, said bearing members forming a universal joint between said body and said truck and forming flexible fluid connections between said motor and said pump and said fluid channels being so arranged that said bearing members are hydrostatically balanced in respect to each other.

3. In a power vehicle having a body, a source of motive fluid carried by said body, a truck arranged beneath said body to support at least a part of the weight thereof, and fluid operated driving means arranged upon said truck to drive said vehicle, the combination of a casing secured to said truck and enclosing said driving means, and a center bearing having an upper part fixed to said body and a lower part fixed to said casing to support said body upon said truck and to provide a pivoted driving connection between said body and said truck, said center bearing having fluid channels extending therethrough for the passage of motive fluid to and from said driving means and fluid-tight joints between the upper and lower parts thereof and said fluid channels being arranged in pairs with the channels of each pair connected together and arranged diametrically opposite each other to hydraulically balance said upper part upon said lower part.

4. In a power vehicle having a body, a truck arranged beneath said body to support at least a part of the weight thereof, a fluid motor carried by said truck for propelling said vehicle, and a source of motive fluid carried by said body, the combination of a female bearing secured to said body and having a substantially semi-spherical socket and fluid channels leading outward from said socket and connected to said motive fluid source, a male bearing secured to said truck and having a substantially spherical head fitted in said socket to support said body and to enable said truck to impart motion thereto, said male bearing having fluid channels formed therein in communication with the fluid channels in said female bearing, and means connecting said motor to the fluid channels in said male bearing.

5. In a power vehicle having a body, a truck arranged beneath said body to support at least a part of the weight thereof, a fluid motor carried by said truck for propelling said vehicle, and a source of motive fluid carried by said body, the combination of a female bearing secured to said body and having a substantially semi-spherical socket and fluid channels leading outward from said socket and connected to said motive fluid source, a male bearing secured to said truck and having a substantially spherical head fitted in said socket to support said body and to enable said truck to impart motion thereto, said male bearing having fluid channels formed therein in communication with the fluid channels in said female bearing, means connecting said motor to the fluid channels in said male bearing, and a hollow plunger arranged in each of said female bearing channels to be urged by the fluid pressure in that channel against the surface of said head to thereby provide a fluid-tight joint between said bearings.

6. In a power vehicle having a body, a truck arranged beneath said body to support at least a part of the weight thereof, a fluid motor carried by said truck for propelling said vehicle, and a source of motive fluid carried by said body, the combination of a female bearing secured to said body and having a substantially semi-spherical socket and four fluid channels leading outward from said socket and connected to said motive fluid source, a male bearing secured to said truck and having a substantially spherical head fitted in said socket to support said body and to enable said truck to impart motion thereto, said male bearing having fluid channels formed therein in communication with the fluid channels in said female bearing, two of the channels in each of said bearings being diametrically opposed to each other and connected together and the other two channels in each of said bearings being connected to each other and spaced 90° from the first two channels whereby said female bearing is pressure balanced upon said male bearing, and means connecting said motor to the fluid channels in said male bearing.

7. In a power vehicle having a body, a truck arranged beneath said body to support at least a part of the weight thereof, a fluid motor carried by said truck for propelling said vehicle, and a source of motive fluid carried by said body, the combination of a female bearing secured to said body and having a substantially semi-spherical socket and four fluid channels leading outward from said socket and connected to said motive fluid source, a male bearing secured to said truck and having a substantially spherical head fitted in said socket to support said body and to enable said truck to impart motion thereto, said male bearing having fluid channels formed therein in communication with the fluid channels in said female bearing, two of the channels in each of said bearings being diametrically opposed to each other and connected together and the other two channels in each of said bearings being connected to each other and spaced 90° from the first two channels whereby said female bearing is pressure balanced upon said male bearing, means connecting said motor to the fluid channels in said male bearing, and a hollow plunger arranged in each of said female bearing channels to be urged by the fluid pressure in that channel against the surface of said head to thereby provide a fluid-tight joint between said bearings.

8. In a power vehicle having a body, a source of motive fluid carried by said body, a truck arranged beneath said body to support at least a part of the weight thereof, and fluid operated driving means arranged upon said truck to propel said vehicle, the combination of a vertical center bearing post rigidly secured to said truck at the top and the bottom thereof, a spherical head fixed to said post upon the upper end thereof and forming therewith a male bearing having fluid channels formed therein and extending upward through said post into said head and then laterally outward to terminate upon the surface of said head, a female bearing fixed to said body and having a socket complementary to said head and fitting upon and around said head and forming with said male bearing a center bearing to transfer weight from said body to said head and to enable said truck to transmit motion to said body, said female bearing having fluid channels formed therein with each in registry with one of the fluid channels in said male bearing and forming therewith a continuous passage through said center bearing, means connecting the upper ends of said passages to said source, and means connecting the lower ends of said passages to said driving means.

9. In a power vehicle having a body, a source of motive fluid carried by said body, a truck arranged beneath said body to support at least a part of the weight thereof, and fluid operated driving means arranged upon said truck to propel said vehicle, the combination of a vertical center bearing post rigidly secured to said truck at the top and the bottom thereof, a spherical head fixed to said post upon the upper end thereof and forming therewith a male bearing having fluid channels formed therein and extending upward through said post into said head and then laterally outward to terminate upon the surface of said head, a female bearing fixed to said body and having a socket complementary to said head and fitting upon and around said head and forming with said male bearing a center bearing to transfer weight from said body to said head and to enable said truck to transmit motion to said body, said female bearing having fluid channels formed therein with each in registry with one of the fluid channels in said male bearing and forming therewith a continuous passage through said center bearing, a hollow plunger fitted in each of said female bearing channels and urged against said head by the fluid pressure in that channel to form a fluid-tight joint between said female bearing and said male bearing, means connecting the upper ends of said passages to said source, and means connecting the lower ends of said passages to said driving means.

10. In a power vehicle having a body, a source of motive fluid carried by said body, a truck arranged beneath said body to support at least a part of the weight thereof, and fluid operated driving means arranged upon said truck to propel said vehicle, the combination of a vertical center bearing post rigidly secured to said truck at the top and the bottom thereof, a spherical head fixed to said post upon the upper end thereof and forming therewith a male bearing having four fluid channels formed therein and extending upward through said post into said head and then laterally outward to terminate upon the surface of said head, a female bearing fixed to said body and having a socket complementary to said head and fitting upon and around said head and forming with said male bearing a center bearing to transfer weight from said body to said head and to enable said truck to transmit motion to said body, said female bearing having four fluid channels formed therein with each in registry with one of the fluid channels in said male bearing and forming therewith a continuous passage through said center bearing, means connecting the upper ends of said passages to said source, and means connecting the lower ends of said passages to said driving means; two of said passages being connected together and arranged diametrically opposite each other and the other two passages being connected to each other and arranged 90° from the first two passages whereby said female bearing is pressure balanced upon said head.

11. In a power vehicle having a body, a source of motive fluid carried by said body, a truck arranged beneath said body to support at least a part of the weight thereof, and fluid operated driving means arranged upon said truck to propel said vehicle, the combination of a vertical center bearing post rigidly secured to said truck at the top and the bottom thereof, a spherical head fixed to said post upon the upper end thereof and forming therewith a male bearing having four fluid channels formed therein and extending upward through said post into said head and then laterally outward to terminate upon the surface of said head, a female bearing fixed to said body and having a socket complementary to said head and fitting upon and around said head and forming with said male bearing a center bearing to transfer weight from said body to said head and to enable said truck to transmit motion to said body, said female bearing having four fluid channels formed therein with each in registry with one of the fluid channels in said male bearing and forming therewith a continuous passage through said center bearing, a hollow plunger fitted in each of said female bearing channels and urged against said head by the fluid pressure in that channel to form a fluid-tight joint between said female bearing and said male bearing, means connecting the upper ends of said passages to said source, and means connecting the lower ends of said passages to said driving means; two of said passages being connected together and arranged diametrically opposite each other and the other two passages being connected to each other and arranged 90° from the first two passages whereby said female bearing is pressure balanced upon said head.

12. In a power vehicle having a body, a source of motive fluid carried by said body, a truck arranged beneath said body to support at least a part of the weight thereof, and fluid operated driving means arranged upon said truck to propel said vehicle, the combination of a casing enclosing said driving means and secured to said truck, a vertical center bearing post rigidly secured to said casing at the top and the bottom thereof, a spherical head fixed to said post upon the upper end thereof and forming therewith a male bearing having fluid channels formed therein and extending upward through said post into said head and then laterally outward to terminate upon the surface of said head, a female bearing fixed to said body and having a socket complementary to said head and fitting upon and around said head and forming with said male bearing a center bearing to transfer weight from said body to said head and to enable said truck to transmit motion to said body, said female bearing having fluid channels formed therein with each in registry with one of the fluid channels in said male bearing and forming therewith a continuous passage through said center bearing, means connecting the upper ends of said passages to said source, and means connecting the lower ends of said passages to said driving means.

13. In a power vehicle having a body, a source of motive fluid carried by said body, a truck arranged beneath said body to support at least a part of the weight thereof, and fluid operated driving means arranged upon said truck to propel said vehicle, the combination of a casing enclosing said driving means and secured to said truck, a vertical center bearing post rigidly secured to said casing at the top and the bottom thereof, a spherical head fixed to said post upon the upper end thereof and forming therewith a male bearing having fluid channels formed therein and extending upward through said post into said head and then laterally outward to terminate upon the surface of said head, a female bearing fixed to said body and having a socket complementary to said head and fitting upon and around said head and forming with said male bearing a center bearing to transfer weight from said body to said head and to enable said truck to transmit motion to said body, said female bearing having fluid channels formed therein with each in registry with one of the fluid channels in said male bearing and forming therewith a continuous passage through said center bearing, a hollow plunger fitted in each of said female bearing channels and urged against said head by the fluid pressure in that channel to form a fluid-tight joint between said female bearing and said male bearing, means connecting the upper ends of said passages to said source, and means connecting the lower ends of said passages to said driving means.

14. In a power vehicle having a body, a source of motive fluid carried by said body, a truck arranged beneath said body to support at least a part of the weight thereof, and fluid operated driving means arranged upon said truck to propel said vehicle, the combination of a casing enclosing said driving means and secured to said truck, a vertical center bearing post rigidly secured to said casing at the top and the bottom thereof, a spherical head fixed to said post upon the upper end thereof and forming therewith a male bearing having four fluid channels formed therein and extending upward through said post into said head and then laterally outward to terminate upon the surface of said head, a female bearing fixed to said body and having a socket complementary to said head and fitting upon and around said head and forming with said male bearing a center bearing to transfer weight from said body to said head and to enable said truck to transmit motion to said body, said female bearing having four fluid channels formed therein with each in registry with one of the fluid channels in said male bearing and forming therewith a continuous passage through said center bearing, means connecting the upper ends of said passages to said source, and means connecting the lower ends of said passages to said driving means; two of said passages being connected together and arranged diametrically opposite each other and the other two passages being connected to each other and arranged 90° from the first two passages whereby said female bearing is pressure balanced upon said head.

15. In a power vehicle having a body, a source of motive fluid carried by said body, a truck arranged beneath said body to support at least a part of the weight thereof, and fluid operated driving means arranged upon said truck to propel said vehicle, the combination of a casing enclosing said driving means and secured to said truck, a vertical center bearing post rigidly secured to said casing at the top and the bottom thereof, a spherical head fixed to said post upon the upper end thereof and forming therewith a male bearing having four fluid channels formed therein and extending upward through said post into said head and then laterally outward to terminate upon the surface of said head, a female bearing fixed to said body and having a socket complementary to said head and fitting upon and around said head and forming with said male bearing a center bearing to transfer weight from said body to said head and to enable said truck to transmit motion to said body, said female bearing having four fluid channels formed therein with each in registry with one of the fluid channels in said male bearing and forming therewith a continuous passage through said center bearing, a hollow plunger fitted in each of said female bearing channels and urged against said head by the fluid pressure in that channel to form a fluid-tight joint between said female bearing and said male bearing, means connecting the upper ends of said passages to said source, and means connecting the lower ends of said passages to said driving means; two of said passages being connected together and arranged diametrically opposite each other and the other two passages being connected to each other and arranged 90° from the first two passages whereby said female bearing is pressure balanced upon said head.

WALTER FERRIS.